United States Patent [19]

Brumley

[11] Patent Number: 4,776,100

[45] Date of Patent: Oct. 11, 1988

[54] CARPET CUTTING GUIDE

[76] Inventor: John Brumley, Group Box 20, Veinerville, Medicine Hat, Alberta, Canada, T1A 7E5

[21] Appl. No.: 19,541

[22] Filed: Feb. 26, 1987

[30] Foreign Application Priority Data

Jun. 25, 1986 [CA] Canada .................................. 512343

[51] Int. Cl.⁴ ................................................ G01B 3/30

[52] U.S. Cl. ...................................... 33/527; 33/41.5; 33/459

[58] Field of Search ................. 33/462, 459, 526, 527, 33/41 R, 41 E, 41 F, 551-554

[56] References Cited

U.S. PATENT DOCUMENTS

| | | | |
|---|---|---|---|
| 994,741 | 6/1911 | Gorenflo | 33/462 |
| 1,211,777 | 1/1917 | Stanfield . | |
| 3,693,261 | 9/1972 | Moore | 33/1 AP |
| 3,934,341 | 1/1976 | Carlson . | |
| 4,095,340 | 6/1978 | Kingsley . | |
| 4,263,717 | 4/1981 | Twining | 33/527 |
| 4,495,697 | 1/1985 | Ruff . | |

FOREIGN PATENT DOCUMENTS

| | | |
|---|---|---|
| 422553 | 9/1944 | Canada . |
| 477389 | 10/1951 | Canada . |
| 825372 | 10/1969 | Canada . |

*Primary Examiner*—Harry N. Haroian
*Attorney, Agent, or Firm*—Browdy and Neimark

[57] ABSTRACT

A cutting guide for use in cutting and fitting carpet has a first planar portion for detachable securement to a carpet and a second, marking portion attached thereto with a working or marking edge for use in transposing the location of a wall/floor edge or the like to the carpet to be cut, when the second, marking portion is positioned along the wall/floor edge and is detachably secured at that location by the carpet.

8 Claims, 3 Drawing Sheets

CARPET CUTTING GUIDE

FIELD OF THE INVENTION

This invention relates to cutting guides and in particular to a cutting guide for use in laying and cutting floor coverings such as carpeting.

BACKGROUND OF THE INVENTION

The most difficult task in cutting and laying carpet is trying to crease thick carpet along a wall and around corners to determine precise cutting points. Usually, either not enough carpet is cut off requiring multiple cuts, or too much carpet is removed leaving unsightly gaps between the terminal edge of the carpet and the wall/floor edge. There has long been a need for a cutting guide for use in cutting and fitting carpet that would provide a high degree of accuracy in this operation. The carpet cutting guide according to the present invention attacks the above mentioned problem successfully and is most effective in normal carpet fitting/cutting situations when cutting and laying carpet along a straight wall section, an outside corner or an inside corner.

SUMMARY OF THE INVENTION

According to a broad aspect, a guide for use in cutting carpet or the like comprises a first portion adapted to be detachably secured to the carpet and a second, marking portion attached to the first portion adjacent one end thereof. The marking portion has a marking or working edge for transposing a wall/floor edge location onto a carpet to be cut when the second portion of the guide is located along the wall and is detachably secured at that location by the carpet.

BRIEF DESCRIPTION OF THE DRAWINGS

The invention is illustrated by way of example in the accompanying drawings in which.

DETAILED DESCRIPTION OF THE INVENTION

Figure 2:
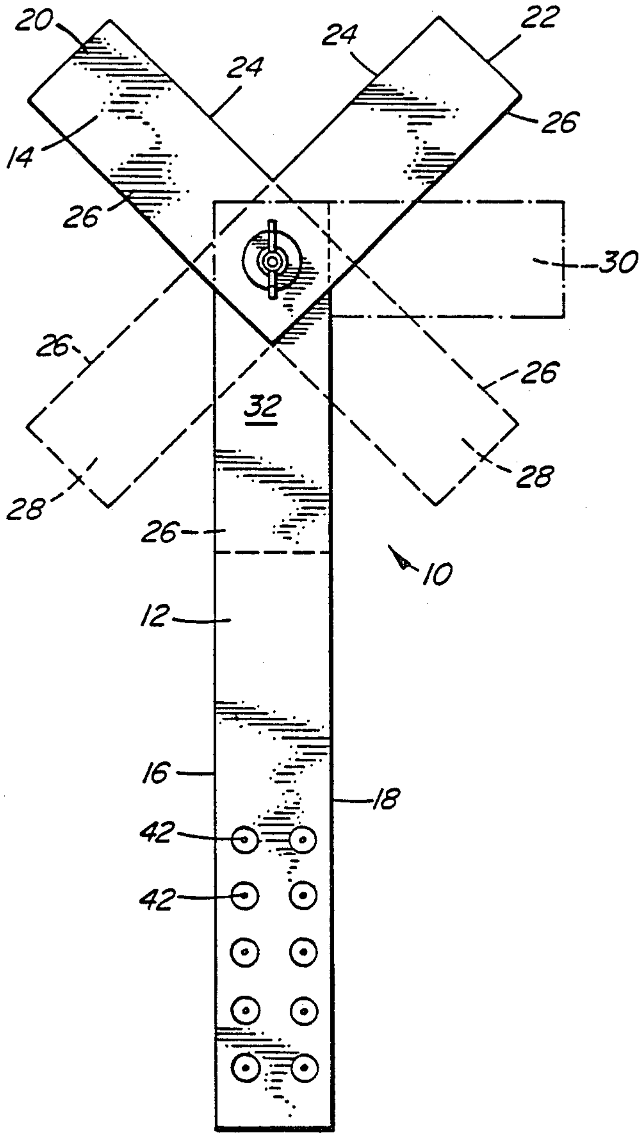
FIG. 2 is a plan view of the device in FIG. 1.
Figure 1:
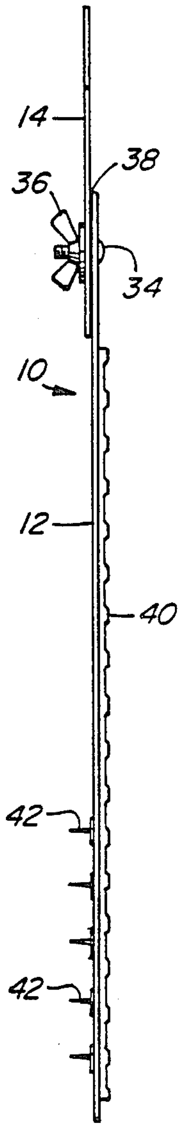
FIG. 1 is a side view of the preferred embodiment of the invention.

Referring to FIGS. 1 and 2, the guide 10 consists of a tail piece or first portion 12 and a working edge piece or second portion 14. Both portions 12 and 14 are generally flat planar members made from rigid or semi-rigid material such as sheet metal, plastic or the like. As illustrated, the first portion has parallel, marginal side edges 16 and 18 and the second portion 14 has a pair of divergent arms 20 and 22 with parallel side edges 24 and 26. As shown in the full line illustration in FIG. 2, the right angle, marginal side edges 24 of arms 20 and 22 constitute an outside corner guide (in that particular position shown in full line) while the side edges 26 of arms 20 and 22 provide an inside corner guide position when the portion 14 is rotated 180° to the position shown in dashed line and indicated at reference 28.

As shown in the location illustrated by the dash and peck line, position 30, the second portion 14 has been rotated so that arm 22 overlies the proximal end 32 of the first portion 12 so that the terminal edges 26 of arms 20 and 22 provide a straight wall guide position.

The second portion 14 is pivotally attached to the proximal end of the first portion 12 by any suitable attaching means that can be released and reset at will such as a carriage bolt 34 and wing nut 36. If necessary, some form of frictional material can be located between the surfaces of the two portions as at 38 to inhibit movement of one portion with respect to the other.

As seen in FIG. 1, the first portion 12 is provided on its rear surface with a suitable form of non-skid material 40 for a purpose to be described hereinafter. Additionally, the upper surface of the first portion 12 is provided with a plurality of carpet-engaging cleats 42, adjacent the distal end of the first portion.

It will be appreciated from the above description that the marking or cutting lines are created by rotating the marking or working edges 24, 26 of the second portion 14 about its pivot point of the carriage bolt 34. A small styrofoam block, not shown, large enough to cover the cleated area of the first portion 12, and to be easily gripped in the hand of the user, is employed as a guard to cover the cleats 42 when the device is not in use and in using the guide.

In use, a carpet is generally positioned in a room to be carpeted with the central area of the carpet fitted and oriented in its final location. Excess carpet to be cut laps the walls.

A wall or corner area of the room is selected from which to begin fitting and the edge of the carpet covering that area is pulled back enough to expose the area of the floor along the wall, to be fitted.

Assuming for the purposes of illustration that the initial area to be fitted is an outside corner, the second or marking portion 14 is secured to the first portion 12 in its full-line illustration of FIG. 2 with the side edges 24,24 forming a 90° V. The first portion 12 is laid on the floor, the non-skid backing 40 inhibiting any movement thereof with the edges 24,24 of the second portion 14 being fitted in place along the wall on either side of the outside corner, the edges 24,24 in effect being situated where the final cut edge of the carpet is to be placed.

With the guide 10 thus positioned, the carpet is carefully rolled back towards the wall and towards the positioned cutting guide 10, the operator being careful to smooth out all wringles and creases in the carpet.

The carpet is rolled forward until it goes over several of the upwardly protruding cleats 42 in the distal end of the first portion 12 of the guide and the operator uses the styrofoam block to firmly embed the carpet downwardly on the cleats 42.

With the guide 10 so secured to the carpet, the carpet is again folded back away from the wall, the operator being careful not to dislodge the cutting guide now attached to the back of the carpet by means of cleats 42.

The outside corner positions of the wall now being properly positioned on the back of the carpet by means of the location of the terminal edges 24,24 of the second portion 14, that location is now transposed onto the back of the carpet by suitable marking means and the installer thus marks his final cut line. The carpet can be cut along the marked locations.

The above steps are repeated at critical along the wall/floor edge, points identified by the guide 10 then being cut and connected using a normal straight edge.

The cutting guide 10 can also be used to advantage in cutting and fitting carpet around curved or irregular shaped edges such as bathroom fixtures, pipes, etc.

Initially, a heavy paper or light cardboard outline of the desired irregular edge is made using a contour gage or flexible ruler. For an elaborate or a long edge the contour outline may have to be in several sections The paper contour outline is then attached to the working edge (such as 26) of the guide 10 using suitable fastening means such as tape.

The paper contour outline with the first portion 12 of the guide attached is positioned on the floor with the contour edge exactly paralleling the final cut edge location.

The installer then rolls back the carpet toward the wall and towards the positioned cutting guide until it goes over several of the protruding cleats 42, pressing the carpet surface over the cleats with the styrofoam block.

As in the previously described method, the carpet is then folded back away from the wall and the cutting line provided by the paper contour is transposed onto the back of the carpet for cutting purposes.

Figure 3:
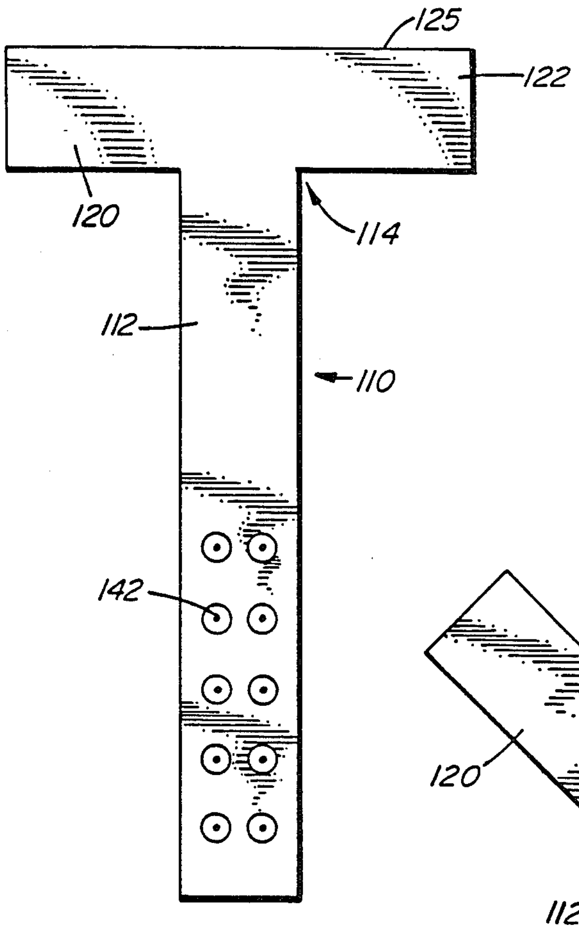
FIGS. 3, 4 and 5 are plan views of forms of another embodiment of the invention.
Figure 4:
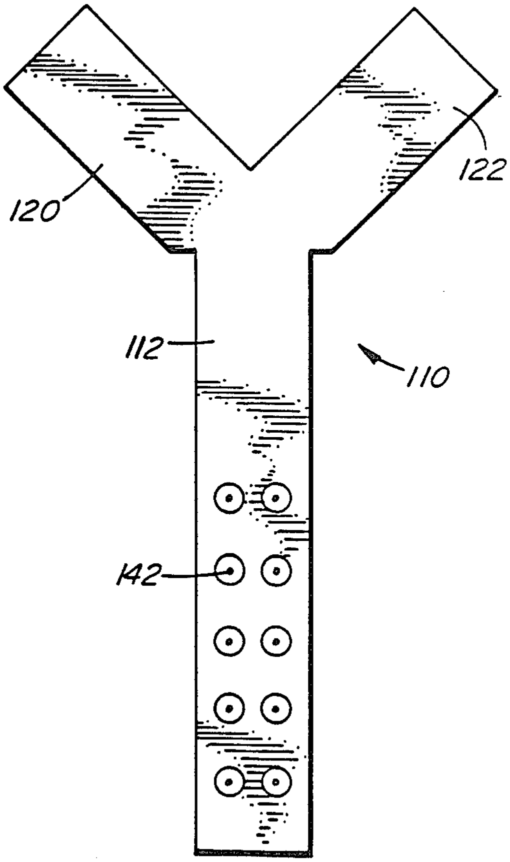
Figure 5:
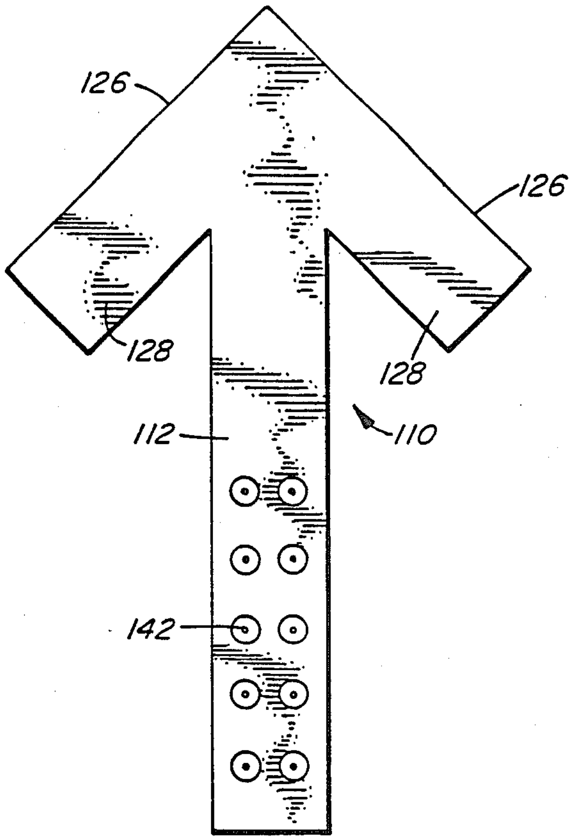

Another embodiment of the invention is shown in the plan views of FIGS. 3, 4 and 5. In this embodiment, instead of having the second or marking portion 14 pivotally attached to a first portion 12, both portions are integrally formed into permanent type guides. Accordingly, in FIG. 3 a guide 110 has a first portion 12 with the second or marking portion 14 in the form of a "T" with arms 120 and 122 having a cutting and marking edge 125. This form of the invention would be used in straight wall carpet marking and cutting.

In FIG. 4, the arms 120 and 122 are located at 90° to one another, 45° to the first portion 112 so that the edges 124 provide cutting and marking edges for an outside corner.

Lastly, in FIG. 5, the guide 110 has divergent arms 128 providing inside corner carpet marking and cutting guide edges 126.

The method of operation using the embodiment of FIGS. 3–5 is the same as that described with respect to the preferred embodiment in FIGS. 1 and 2.

While the invention has been described in connection with a specific embodiment thereof and in a specific use, various modifications thereof will occur to those skilled in the art without departing from the spirit and the scope of the invention as set forth in the attached claims.

The terms and expressions which have been employed in the specification are used as terms of description and not of limitation and there is no intention in the use of such terms and expressions to exclude any equivalence of the features shown and described or portions thereof, but it is recognized that various modifications are possible within the scope of the invention claimed.

The embodiments of the invention in which an exclusive property or privilege is claimed are defined as follows:

1. A guide for use in cutting carpet or the like comprising a first portion adapted to be detachably secured to said carpet and a second, marking portion attached to said first portion adjacent one end thereof, said marking portion having a working edge for transposing a wall/floor edge location onto a carpet to be cut when said second portion of said guide is located along said wall and is detachably secured at that location by said carpet;

and a non-skid backing on the lower surface of said first portion and cleat means on the upper surface of the first portion adjacent the distal end thereof.

2. A guide according to claim 1 wherein the marking portion is integrally formed with said first portion.

3. A guide according to claim 1 wherein said marking portion is detachably secured to said first portion and is movable thereon to a plurality of positions relative to said first portion.

4. A guide according to claim 1 wherein said first portion is an elongated planar body and said second, marking portion is an L-shaped, planar member pivotally mounted to the proximal end of said first portion.

5. A guide for use in cutting carpet or the like comprising a first portion adapted to be detachably secured to said carpet and a second, marking portion pivotally attached to said first portion adjacent one end thereof; each of said portions being formed of at least semi-rigid, planar material; said first portion having the configuration of an elongated rectangle with parallel, marginal side edges, a non-skid material on the lower surface thereof and a plurality of carpet-engaging cleats on the upper surface thereof adjacent the distal end; said second, marking portion comprising a right angled shaped member having a pair of divergent arms with parallel marginal side edges providing a plurality of corner and wall guide marking edges; and means detachably and adjustably securing the second portion onto said first portion adjacent the proximal end thereof; the side edges of said second portion being adapted to transpose the location of a wall/floor edge line onto a surface of a carpet to be cut when the second portion of said guide is located along said wall/floor edge and is detachably secured at that location by said carpet.

6. A guide for use in cutting carpet or the like comprising a first portion adapted to be detachably secured to said carpet and a second, marking portion integral with said first portion adjacent one end thereof; said guide being formed of at least semi-rigid, planar material; said first portion having the configuration of an elongated rectangle with parallel, marginal side edges, a non-skid material on the lower surface thereof and a plurality of carpet-engaging cleats on the upper surface thereof adjacent the distal end; said second, marking portion comprising an angle shaped member having a pair of divergent arms with parallel marginal side edges providing at least one wall guide marking edge; the side edges of said second portion being adapted to transpose the location of a wall/floor edge line onto a surface of a carpet to be cut when the second portion of said guide is located along said wall/floor edge and is detachably secured at that location by said carpet.

7. A guide according to claim 2, wherein said first portion is an elongated planar body and said second, marking portion is an L-shaped, planar member pivotally mounted to the proximal end of said first portion.

8. A guide according to claim 3, wherein said first portion is an elongated planar body and said second, marking portion is an L-shaped, planar member pivotally mounted to the proximal end of said first portion.

* * * * *